Dec. 31, 1968

C. M. VERHAGEN 3,418,722

COMPASS CARD MOUNTING

Filed Feb. 15, 1966

CORNELIS MARINUS VERHAGEN INVENTOR.

BY

CORNELIS MARINUS
VERHAGEN
        INVENTOR.

United States Patent Office 3,418,722
Patented Dec. 31, 1968

3,418,722
COMPASS CARD MOUNTING
Cornelis M. Verhagen, Heemstede, Netherlands, assignor to Datawell N.V., Haarlem, Netherlands
Filed Feb. 15, 1966, Ser. No. 527,460
Claims priority, application Netherlands, Feb. 16, 1965, 6501890
6 Claims. (Cl. 33—222)

ABSTRACT OF THE DISCLOSURE

A compass having a compass card with its center region being a thin flexible diaphragm clamped between pins on opposite sides of the diaphragm, the clamped part of the diaphragm being in the center of the compass card. Allows tilting of the compass card over a large angle while still remaining centered, and facilitates reading of the compass from a distance while still maintaining accuracy.

---

The invention relates to a compass having a compass card, which is supported in its center by means of a pin, pivot or suchlike, means being provided to avoid that the card can shift with respect to the pin. Such a compass card is for instance known from the French patent specification 1,096,703. With this known construction the compass card can tilt, but the tilting angle is relatively small. This may be a disadvantage for certain compass applications. Another disadvantage of this known compass is, that it is not very suitable for telemeasuring systems, because only the compass card rotates.

Accordingly it is an object of the invention to provide a compass, enabling the card to tilt over a larger angle and nevertheless to remain centered with respect to the pin, pivot or suchlike, whereas further reading the compass from a distance, when maintaining a sufficient accuracy, is made more easy.

The above objects of the invention are attained according to the invention in that the center of the card consists of a thin flexible diaphragm and in that the diaphragm between the said pin, pivot or suchlike and a further pin, pivot or suchlike opposite to the first one, has been clamped.

Reference is made to the Dutch patent specification 52,574, which shows a compass, having a compass card, the center of which consists of two parallel circular diaphragms, for instance of cellophane, a cap being connected to them for supporting the compass card. This construction does not show the clamping between two points with a great possible tilting angle as shown in the invention, it being further indicated, that obviously no flexible diaphragm has been aimed at because cellophane is used.

Further details of the invention are indicated with reference to the drawing, in which an embodiment of he invention has been shown.

Figure 3:
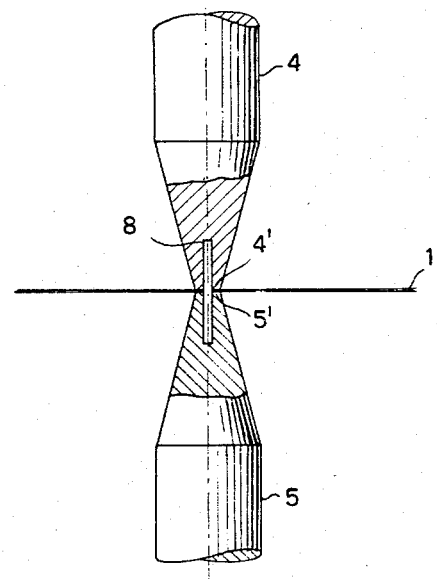

FIG. 3 finally shows a detail on an enlarged scale.

In the drawing reference 1 indicates a thin diaphragm of flexible material, for instance rubber, that at its edge 2 has been affixed to the edge of a compass card 3 carrying a magnet system, which attachment preferably is carried out by means of clamping. The center of diaphragm 1 is clamped between the ends of pins 4 and 5, which are mounted with a common center line and are supported by means of bearings 6. By this a mounting has been obtained in which the compass card has a high degree of liberty to tilt, as more specifically is shown in FIG. 2, but with which the rotation around the center line of both pins 4 and 5 is transmitted, so that a relatively accurate reading is possible.

Figure 1:
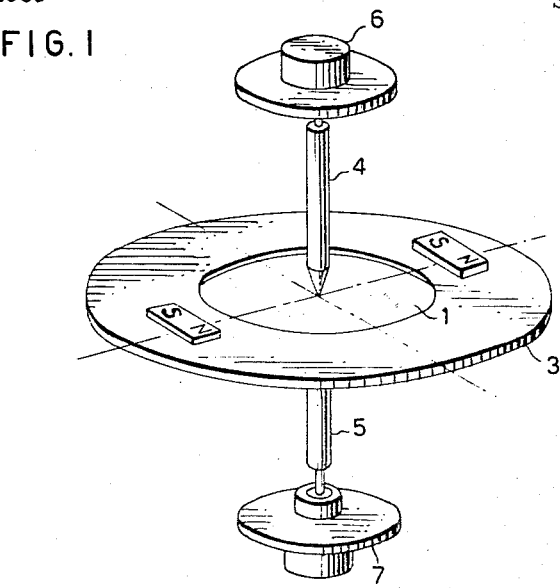
FIG. 1 shows a schematical perspective view of an embodiment of the invention.
Figure 2:
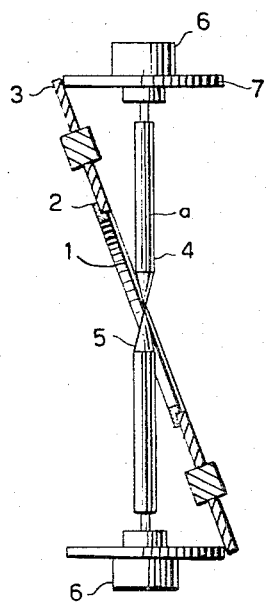
FIG. 2 shows a cross-section of the same embodiment of the invention, but in the tilted position of the compass card.

In FIGURES 1 and 2 at the upper and lower sides of the pins 4 and 5 stop discs 7 are shown, which are symmetrical with respect to the center of the diaphragm, so that the compass card when tilting engages at the same moment the upper and the lower disc 7. By reason of this such engagement will not exert a force on the center, by reason of which the centered position of the diaphragm easily can be maintained. The unit discussed up till now can rotate in bearings 6 and this rotational movement can in any manner known per se be used for reading the compass position at a distant location or for automatic control purposes.

Details of an embodiment of the clamping of diaphragm 1 between the pins 4 and 5 are shown in FIGURE 3. The pins 4 and 5 have each a small flat end surface 4' and 5' respectively and a central hole of limited depth, in which holes a single pin 8 has been inserted. Between the surfaces 4' and 5' the diaphragm 1 has been clamped, which diaphragm is provided at its center with a round hole, through which pin 8 passes. The pins 4 and 5 are exactly centered by means of pin 8, whereas the width of the distance between pins 4 and 5 and consequently the force exerted by surfaces 4' and 5' can be maintained by means of pin 8, which for that reason either has been clamped in the holes of the pins 4 and 5, or has been soldered in at least one of said holes, or cooperates with at least one of said pins by means of a screwthread connection or has been attached to the pins in any other way.

What I claim is:

1. A compass having a compass card the center region of which consists of a thin flexible diaphragm said diaphragm being clamped between a pin at one side of the diaphragm and another pin aligned with the first one and positioned at the other side of the diaphragm, the said clamped part of the diaphragm being in the center of the compass card.

2. A compass having a compass card the center region of which consists of a thin flexible diaphragm said diaphragm being clamped between an end surface of a pin at one side of the diaphragm and another end surface of a pin aligned with the first one and positioned at the other side of the diaphragm, the said clamped part of the diaphragm being in the center of the compass card.

3. A compass having a compass card the center region of which consists of a thin flexible diaphragm said diaphragm being clamped between an end surface of a support pin at one side of the diaphragm and another end surface of a further support pin aligned with the first one and positioned at the other side of the diaphragm, the said clamped part of the diaphragm being in the center of the compass card, a connecting pin connecting the support pins with each other and passing through the diaphragm in the region of it that lies between the said end surfaces of the support pins and bearings rotatably supporting the support pins.

4. A compass having a compass card the center region of which consists of a thin flexible diaphragm said diaphragm being clamped between an end surface of a pin at one side of the diaphragm and another end surface of a pin aligned with the first one and positioned at the other side of the diaphragm, the said clamped part of the diaphragm being in the center of the compass card, a connecting pin passing through the diaphragm in the region of it that lies between the said end surfaces of the first mentioned pins, said compass having further above and below the center of the card circular stops, said stops being positioned in planes perpendicular to the axis of the said support pins and having such a diameter that a line engaging the circular edges of one of them and passing through the clamped center of the diaphragm, engages also the circular edge of the other of them.

5. A compass having a compass card the center region of which consists of a thin flexible diaphragm said diaphragm being clamped between an end surface of a pin at one side of the diaphragm and another end surface of a pin aligned with the first one and positioned at the other side of the diaphragm, the said clamped part of the diaphragm being in the center of the compass card, a connecting pin connecting the support pins with each other passing through the diaphragm in the region of it that lies between the said end surfaces of the support pins, said compass having further above and below the center of the card circular stops, said stops being positioned in planes perpendicular to the axis of the said support pins and having such a diameter that a line engaging the circular edges of one of them and passing through the clamped center of the diaphragm, engages also the circular edge of the other of them, the diameter of the circular stops being such, that the compass card can freely tilt over an angle of more than 120°, whereas the support pins are provided with frusto-conical ends having an apex angle of less than 30°.

6. A compass having a compass card the center region of which consists of a thin flexible rubber diaphragm said rubber diaphragm being clamped between a pin at one side of the diaphragm and another pin aligned with the first one and positioned at the other side of the rubber diaphragm, the said clamped part of the rubber diaphragm being in the center of the compass card.

References Cited

FOREIGN PATENTS

| 1,884 | 8/1854 | Great Britain. |
| 4,883 | 3/1908 | Great Britain. |

ROBERT B. HULL, *Primary Examiner.*